United States Patent
Zhao

(10) Patent No.: US 11,917,507 B2
(45) Date of Patent: Feb. 27, 2024

(54) METHOD, APPARATUS AND SYSTEM FOR FEEDBACK INFORMATION TRANSMISSION BETWEEN INTERNET OF VEHICLES DEVICES

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 466 days.

(21) Appl. No.: 17/267,079

(22) PCT Filed: Aug. 10, 2018

(86) PCT No.: PCT/CN2018/100058
§ 371 (c)(1),
(2) Date: Feb. 9, 2021

(87) PCT Pub. No.: WO2020/029279
PCT Pub. Date: Feb. 13, 2020

(65) Prior Publication Data
US 2021/0274327 A1   Sep. 2, 2021

(51) Int. Cl.
*H04W 4/40* (2018.01)
*H04L 1/1812* (2023.01)
(Continued)

(52) U.S. Cl.
CPC ............. *H04W 4/40* (2018.02); *H04L 1/1812* (2013.01); *H04W 72/0453* (2013.01); *H04W 72/20* (2023.01)

(58) Field of Classification Search
CPC ... H04W 4/40; H04W 72/0453; H04W 72/20; H04L 1/1812; H04L 1/08; H04L 1/1854;
(Continued)

(56) References Cited

U.S. PATENT DOCUMENTS

2005/0249120 A1* 11/2005 Heo ................... H04L 1/1874
370/236
2009/0327829 A1* 12/2009 Yang ................... H04L 1/1829
714/E11.01

(Continued)

FOREIGN PATENT DOCUMENTS

| CN | 106797283 A | 5/2017 |
| WO | WO 2017/192009 A1 | 11/2017 |
| WO | WO 2018/131922 A1 | 7/2018 |

OTHER PUBLICATIONS

International Search Report dated Apr. 16, 2019 in PCT/CN2018/100058 (submitting English translation only), 2 pages.
(Continued)

*Primary Examiner* — Ayaz R Sheikh
*Assistant Examiner* — Tarell A Hampton
(74) *Attorney, Agent, or Firm* — Oblon, McClelland, Maier & Neustadt, L.L.P.

(57) ABSTRACT

Aspects of this disclosure can provide a method for transmitting feedback information between Internet of Vehicles devices. The method can include that a first Internet of Vehicles device sends first user data to a second Internet of Vehicles device, the first Internet of Vehicles device and the second Internet of Vehicles device respectively determine a feedback time window of the first user data according to a transmission end time of the first user data. Further, the second Internet of Vehicles device can send hybrid automatic repeat request (HARQ) feedback information of the first user data to the first Internet of Vehicles device in the feedback time window of the first user data. The first internet of Vehicles device receives the HARQ feedback information in the feedback time window of the first user data.

12 Claims, 7 Drawing Sheets

(51) Int. Cl.
*H04W 72/0453* (2023.01)
*H04W 72/20* (2023.01)

(58) Field of Classification Search
CPC ..... H04L 5/0055; H04L 67/12; H04L 1/1607; H04L 5/0053
See application file for complete search history.

(56) References Cited

U.S. PATENT DOCUMENTS

| | | | |
|---|---|---|---|
| 2010/0240312 A1* | 9/2010 | Peng | H04W 72/541 455/63.1 |
| 2013/0166983 A1 | 6/2013 | Graumann | |
| 2014/0328306 A1* | 11/2014 | Gao | H04W 16/14 370/329 |
| 2017/0215183 A1 | 7/2017 | Gulati et al. | |
| 2017/0347394 A1 | 11/2017 | Yasukawa et al. | |
| 2018/0077716 A1* | 3/2018 | Dai | H04W 72/04 |
| 2019/0052411 A1* | 2/2019 | Chae | H04W 52/242 |
| 2019/0132104 A1 | 5/2019 | Lee. et al. | |
| 2019/0364590 A1* | 11/2019 | Sartori | H04W 72/23 |
| 2020/0092692 A1* | 3/2020 | Wang | H04W 76/14 |
| 2020/0163005 A1* | 5/2020 | Rao | H04W 4/46 |
| 2021/0400687 A1* | 12/2021 | Yeo | H04W 72/1263 |

OTHER PUBLICATIONS

Written Opinion of the International Searching Authority dated Apr. 16, 2019 in PCT/CN2018/100058, (submitting English translation only), 5 pages.

Combined Chinese Office Action and Search Report dated Sep. 10, 2020, in Chinese Patent Application No. 2018800010137 (with English translation), 14 pages.

"On HARQ/Scheduling Timing and Self-Contained Operation" Nokia, Alcatel-Lucent Shanghai Bell, 3GPP TSG-RAN WG1 #87, R1-1612241, Nov. 11, 2016, 6 pages.

"A Common Framework for Control Channel Design for NR" InterDigital Communications, 3GPP TSG RAN WG1 Meeting #37, R1-1612645, Nov. 5, 2016, 4 pages.

Extended Eurapean Search Report dated Jul. 22, 2021 in European Patent Application No. 18929232.9, 10 pages.

* cited by examiner

US 11,917,507 B2

METHOD, APPARATUS AND SYSTEM FOR FEEDBACK INFORMATION TRANSMISSION BETWEEN INTERNET OF VEHICLES DEVICES

RELATED APPLICATION

This application claims the benefit of International Application No. PCT/CN2018/100058, entitled "Method, Apparatus and System For Feedback Information Transmission Between Internet of Vehicles Devices" and filed on Aug. 10, 2018, which is incorporated herein by reference in its entirety.

TECHNICAL FIELD

The present disclosure generally relates to the wireless communication technology, including to a method, apparatus and system for feedback information transmission between Vehicle to Everything (V2X) devices.

BACKGROUND

As a new development direction of automotive technologies, Vehicle to Everything (V2X) combines technologies such as navigation and positioning, wireless communication, and remote sensing. Information transmission between V2X devices is carried out through broadcast information. For example, a V2X device at a transmitter transmits user data as well as scheduling allocation control signaling. The control signaling contains scheduling information for receiving corresponding user data, which includes time-frequency shift resource allocation, modulation and coding scheme, resource occupation information, priority information, and the like. Moreover, a V2X device at a receiver will receive all the data that can be received at the physical layer, and filter the data at the media access control (MAC) layer.

SUMMARY

The present disclosure provides a method for feedback information transmission between Vehicle to Everything (V2X) devices as follows.

According to a first aspect of the disclosure, there is provided a method for feedback information transmission between Vehicle to Everything (V2X) devices. The method can include transmitting, by a first V2X device, first user data to a second V2X device, receiving, by the second V2X device, the first user data, and determining, by the first V2X device and the second V2X device respectively, a feedback time window for the first user data according to end time of the first user data transmission. The method can further include transmitting, by the second V2X device, hybrid automatic repeat request (HARQ) feedback information for the first user data to the first V2X device in the feedback time window for the first user data, and receiving, by the first V2X device, the HARQ feedback information in the feedback time window for the first user data.

According to a second aspect of the disclosure, there is provided a method for feedback information transmission between Vehicle to Everything (V2X) devices. The method can include a second V2X device receiving first user data from a first V2X device. The second V2X device can determine a feedback time window for the first user data according to end time of the first user data transmission, and the second V2X device can transmit hybrid automatic repeat request (HARQ) feedback information for the first user data to the first V2X device in the feedback time window for the first user data.

Alternatively, the second V2X device determining the feedback time window for the first user data according to the end time of the first user data transmission can include that the second V2X device acquiring time window offset information indicating an offset duration between a low boundary or an upper boundary of the feedback time window for the first user data and the end time of the first user data transmission, and the second V2X device determining the feedback time window for the first user data according to the time window offset information and the end time of the first user data transmission.

Alternatively, the second V2X device acquiring the time window offset information can include the second V2X device acquiring the time window offset information that is preset, the second V2X device acquiring the time window offset information that corresponds to a service type of the first user data, the second V2X device acquiring the time window offset information that corresponds to a subcarrier spacing of a time-frequency resource for the first user data, or the second V2X device acquiring offset indication information carried in scheduling control information for the first user data, and acquiring the time window offset information indicated by the offset indication information.

Alternatively, the second V2X device transmitting the HARQ feedback information for the first user data to the first V2X device in the feedback time window for the first user data can include transmitting, in the feedback time window for a last retransmission of the first user data, the HARQ feedback information for the first user data, in response to that the first user data is data to be retransmitted, or transmitting, for each retransmission of the first user data, the HARQ feedback information for a retransmission of the first user data in a feedback time window corresponding to the retransmission of the first user data, in response to that the first user data is data to be retransmitted.

Alternatively, the second V2X device transmitting the HARQ feedback information for the first user data to the first V2X device in the feedback time window for the first user data can include the second V2X device detecting a target time-frequency resource that satisfies a feedback condition in the feedback time window for the first user data, and the second V2X device transmitting the HARQ feedback information for the first user data on the target time-frequency resource.

Alternatively, the feedback condition can include at least one of the following conditions: a value of signal energy of a corresponding time-frequency resource detected by the second V2X device being less than a preset signal energy threshold; the value of the signal energy of the corresponding time-frequency resource detected by the second V2X device being a minimum one among values of the signal energy of all time-frequency resources in the same time-domain; the second V2X device not transmitting data other than the HARQ feedback information on a corresponding time domain resource or a corresponding time-frequency resource; and the corresponding time-frequency resource is the time-frequency resource indicated by feedback resource indication information carried in scheduling control information for the first user data.

Alternatively, in response to that the feedback time window for the first user data overlaps with a feedback time window for at least one second user data, the second V2X device transmitting the HARQ feedback information for the first user data to the first V2X device in the feedback time window for the first user data can include the second V2X device acquiring an overlapping time window of the feedback time window for the first user data and the feedback time window for the at least one second user data, the second V2X device acquiring combined information of the HARQ feedback information for the first user data and HARQ feedback information for the at least one second user data, and the second V2X device transmitting the combined information in the overlapping time window.

Alternatively, the second V2X device transmitting the HARQ feedback information for the first user data to the first V2X device in the feedback time window for the first user data includes the second V2X device transmitting the HARQ feedback information having data indication information in the feedback time window for the first user data. The data indication information can include an address of the first V2X device, an address of the second V2X device, and a HARQ process identifier, the address of the first V2X device and the address of the second V2X device, or a time-frequency location of the first user data.

According to a third aspect of the disclosure, there is provided a method for feedback information transmission between Vehicle to Everything (V2X) devices. The method can include a first V2X device transmitting first user data to a second V2X device, the first V2X device determining a feedback time window for the first user data according to end time of the first user data transmission, and the first V2X device receiving hybrid automatic repeat request (HARQ) feedback information of the first user data in the feedback time window for the first user data.

Alternatively, the first V2X device receiving the HARQ feedback information of the first user data in the feedback time window for the first user data include the first V2X device monitoring the HARQ feedback information for the first user data on each available time-frequency resource within the feedback time window for the first user data.

Alternatively, the first V2X device receiving the HARQ feedback information for the first user data in the feedback time window for the first user data includes the first V2X device receiving the HARQ feedback information including data indication information in the feedback time window for the first user data. The data indication information can include an address of the first V2X device, an address of the second V2X device, and a HARQ process identifier, or the data indication information can include the address of the first V2X device and the address of the second V2X device, or the data indication information can include a time-frequency location of the first user data.

According to a fourth aspect of the disclosure, there is provided an apparatus for feedback information transmission between Vehicle to Everything (V2X) devices, used in a second V2X device. The apparatus can include a user data receiving module that is configured to receive first user data from a first V2X device, a time window determination module that is configured to determine a feedback time window for the first user data according to end time of the first user data transmission, a feedback information transmission module that is configured to transmit hybrid automatic repeat request (HARQ) feedback information for the first user data to the first V2X device in the feedback time window for the first user data.

Alternatively, the time window determination module is specifically configured to acquire time window offset information indicating an offset duration between a lower and upper boundary of the feedback time window for the first user data and the end time of the first user data transmission, and determine the feedback time window for the first user data according to the time window offset information and the end time of the first user data transmission.

The second V2X device acquiring the time window offset information can include the second V2X device acquiring the time window offset information that is preset, the second V2X device acquiring the time window offset information that corresponds to a service type of the first user data, the second V2X device acquiring the time window offset information that corresponds to a subcarrier spacing of a time-frequency resource for the first user data, or the second V2X device acquiring offset indication information carried in scheduling control information for the first user data, and acquiring the time window offset information indicated by the offset indication information.

Alternatively, the feedback information transmission module is specifically configured to transmit, in the feedback time window for a last retransmission of the first user data, the HARQ feedback information for the first user data, in response to that the first user data is data to be retransmitted, or transmit, for each retransmission of the first user data, the HARQ feedback information for a retransmission of the first user data in a feedback time window corresponding to the retransmission of the first user data, in response to that the first user data is data to be retransmitted.

Alternatively, the feedback information transmission module is specifically configured to detect a target time-frequency resource that satisfies a feedback condition in the feedback time window for the first user data, and transmit the HARQ feedback information for the first user data on the target time-frequency resource.

Alternatively, the feedback condition includes at least one of the following conditions: a value of signal energy of a corresponding time-frequency resource detected by the second V2X device being less than a preset signal energy threshold; the value of the signal energy of the corresponding time-frequency resource detected by the second V2X device being a minimum one among values of the signal energy of all time-frequency resources in the same time-domain; the second V2X device not transmitting data other than the HARQ feedback information on a corresponding time domain resource or a corresponding time-frequency resource; and the corresponding time-frequency resource is the time-frequency resource indicated by feedback resource indication information carried in scheduling control information for the first user data.

The feedback information transmission module is specifically configured to acquire an overlapping time window of the feedback time window for the first user data and a feedback time window for at least one second user data, in response to that the feedback time window for the first user data overlaps with the feedback time window for the at least one second user data, acquire combined information of the HARQ feedback information for the first user data and HARQ feedback information for the at least one second user data, and transmit the combined information in the overlapping time window.

Alternatively, the feedback information transmission module is specifically configured to transmit the HARQ feedback information including data indication information in the feedback time window for the first user data. The data indication information can include an address of the first V2X device, an address of the second V2X device, and a HARQ process identifier, or the data indication information comprises the address of the first V2X device and the address of the second V2X device, or the data indication information comprises a time-frequency location of the first user data.

According to a fifth aspect of the disclosure, there is provided an apparatus for feedback information transmission between Vehicle to Everything (V2X) devices, used in a first V2X device. The apparatus can include a data transmission module that is configured to transmit first user data to a second V2X device, a time window determination module that is configured to determine a feedback time window for the first user data according to end time of the first user data transmission, and a feedback information receiving module that is configured to receive hybrid automatic repeat request (HARQ) feedback information for the first user data in the feedback time window for the first user data.

Alternatively, the feedback information receiving module is specifically configured to monitor the HARQ feedback information for the first user data on each available time-frequency resource within the feedback time window for the first user data.

Alternatively, the feedback information receiving module is specifically configured to receive the HARQ feedback information comprising data indication information in the feedback time window for the first user data. The data indication information can include an address of the first V2X device, an address of the second V2X device, and a HARQ process identifier, or the data indication information comprises the address of the first V2X device and the address of the second V2X device, or the data indication information comprises a time-frequency location of the first user data.

According to a sixth aspect of the disclosure, there is provided an apparatus for feedback information transmission between Vehicle to Everything (V2X) devices, used in a second V2X device. The apparatus can include a processor and a memory that stores a computer program executable by the processor. The processor can be configured to receive first user data from a first V2X device, determine a feedback time window for the first user data according to end time of the first user data transmission, and transmit hybrid automatic repeat request (HARQ) feedback information for the first user data to the first V2X device in the feedback time window for the first user data.

According to a seventh aspect of embodiments of the present disclosure, there is provided an apparatus for feedback information transmission between Vehicle to Everything (V2X) devices, used in a first V2X device. The apparatus can include a processor and a memory storing a computer program executable by the processor. The processor can be configured to transmit first user data to a second V2X device, determine a feedback time window for the first user data according to end time of the first user data transmission, and receive hybrid automatic repeat request (HARQ) feedback information for the first user data in the feedback time window for the first user data.

According to an eighth aspect of the disclosure, there is provided a non-transitory computer readable medium having stored thereon computer executable instructions that are called by a processor of a second V2X device, to implement the method for feedback information transmission between V2X devices described in the above second aspect or any optional solution of the second aspect.

According to a ninth aspect of the disclosure, there is provided a non-transitory computer readable medium having stored thereon computer executable instructions that are called by a processor of a first V2X device, to implement the method for feedback information transmission between V2X devices described in the above third aspect or any optional solution of the third aspect to be performed.

The technical solutions provided by the embodiments of the present disclosure may include beneficial effects. For example, after the first user data is transmitted by the first V2X device to the second V2X device, the second V2X device determines the feedback time window for transmitting the HARQ feedback information for the first user data according to the end time of the first user data transmission, and transmits the HARQ feedback information for the first user data in the determined feedback time window. Correspondingly, the first V2X device also receives the HARQ feedback information transmitted by the second V2X device in the same feedback time window, that is, the transmission time window of the feedback information is determined by the end time of the user data transmission, and there is no need to provide a central node to schedule the feedback resources, which realizes the support of HARQ feedback in the V2X communication.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the invention and, together with the description, serve to explain the principles of the invention.

DETAILED DESCRIPTION

Figure 1:
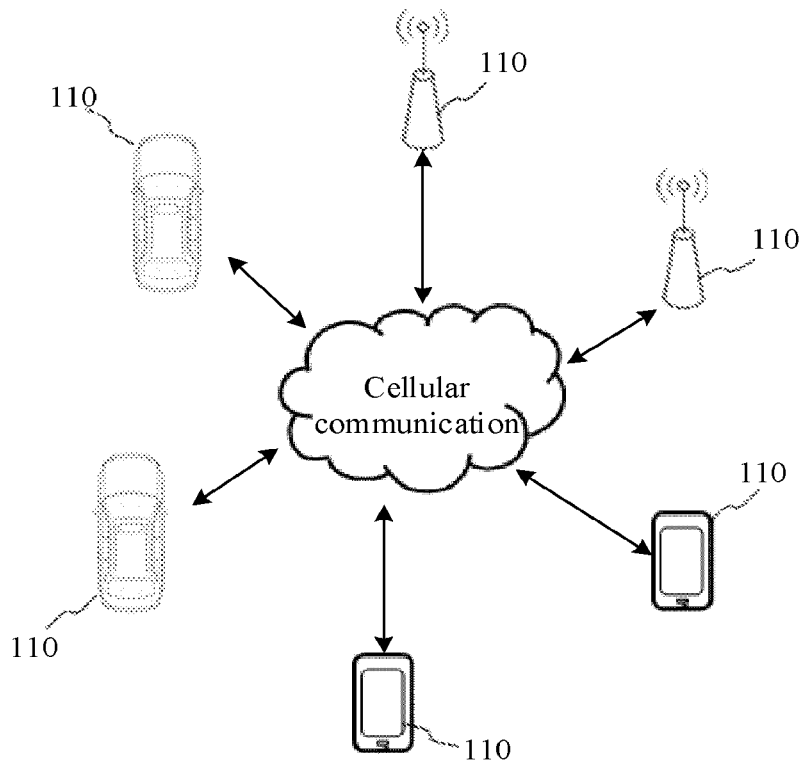
FIG. 1 is a schematic diagram of an application scenario related to a method for feedback information transmission between V2X devices according to some exemplary embodiments.

The exemplary embodiments of the present disclosure are described in detail herein, and their examples are illustrated in the drawings. When the following description refers to the drawings, the same numbers in different drawings represent the same or similar elements unless otherwise indicated. The implementations described in the following exemplary embodiments do not represent all implementations consistent with the present disclosure. On the contrary, they are merely examples of devices and methods consistent with some aspects of the present disclosure, as detailed in the appended claims.

It should be understood that "some" mentioned in the present disclosure refers to one or more, and "a plurality of" refers to two or more. "And/or" describes the association relationship of the associated objects, indicating that there can be three types of relationships. For example, A and/or B can indicate the following cases: A exists alone, A and B exist at the same time, and B exists alone. The character "|" generally indicates that the associated objects are in an "or" relationship.

Internet of vehicle communication is also known as V2X (Vehicle to Everything) communication, which includes Vehicle to Vehicle (V2V) communication technology, Vehicle to Infrastructure (V2I) communication technology and V2P (Vehicle to Pedestrian) communication technology. Through the communication of V2V, V2I and V2P, the V2X technology can effectively improve traffic safety and traffic efficiency, as well as enrich people's travel experience.

By utilizing the existing cellular communication technology to support the V2X communication, existing base station deployments can be effectively utilized and equipment overhead can also be reduced. Moreover, it facilitates providing Quality of Service (QoS) guaranteed services to meet demands of V2X services. Therefore, Rel-14/15 of Long Term Evolution (LTE) technology provides support of the V2X communication by cellular networks, that is, Cellular based V2X (C-V2X). In the C-V2X technology, the communication between a vehicle-mounted device and other devices can be transferred through a base station and a core network, that is, the communication link between the terminal device and the base station in the existing cellular network is used for the communication (uplink/downlink communication) between the vehicle-mounted device and other devices. In another possible manner, the vehicle-mounted device and other devices can also communicate directly through a direct link between these devices, for example, through a sidelink. Compared with the uplink/downlink communication, the sidelink communication has the characteristics of short delay and low overhead, which is very suitable for direct communication between the vehicle-mounted device and other peripheral devices in a close geographical position.

V2X sidelink communication in LTE can support some basic security V2X applications, for instance, the exchange of Basic Safety Message (BSM), such as Cooperative Awareness Messages (CAM) or Decentralized Environmental Notification Message (DENM), voice broadcast communication, etc. With the recent development of automatic driving technology, in order to support new V2X services, new requirements have been put forward for the performance of V2X technology. The usage of 5G NR (New Radio) technology to support new V2X communication services and scenarios has been planned as an important content item of Rel16 by the 3GPP. The 3GPP working group has established a number of new V2X communication service requirements to be met, including Vehicles Platooning, Extended Sensors, Advanced Driving, and Remote Driving. In general, NR V2X sidelink needs to provide higher communication rates, shorter communication delays, and more reliable communication quality.

V2X in LTE does not support multicast or unicast communication at the physical layer, and all communications at the physical layer are transmitted by broadcast. When a V2X device transmits user data through Physical Sidelink Share Channel (PSSCH), it transmits scheduling assignment (SA) control signaling through Physical Sidelink Control Channel (PSCCH). Since it is broadcast communication, the SA control signaling generally does not contain an address of the transmitter or the receiver. The physical layer of the V2X device at the receiver receives all the V2X data that can be received, and the MAC layer of the V2X device at the receiver performs further screening.

However, in V2X of 5G NR, in order to meet new service requirements, the physical layer of the V2X device needs to support unicast and multicast communication. As the physical layer of the V2X device supports unicast and multicast communication, the modulation and coding scheme can be effectively adjusted according to the channel quality, and the closed-loop power control or more refined time and frequency resource allocation, etc. can be performed. Therefore, the broadcast transmission mode of the LTE V2X physical layer in the related art needs to be modified.

The present disclosure designs various embodiments, and illustrates schemes for implementing support for HARQ feedback when unicast communication is performed between V2X devices.

FIG. 1 is a schematic diagram of an application scenario related to a method for feedback information transmission between Vehicle to Everything (V2X) devices according to some exemplary embodiments. As shown in FIG. 1, the application scenario may include a plurality of V2X devices 110.

The V2X device 110 is a wireless communication device that supports the V2X technology. For example, the V2X device 110 may support the cellular mobile communication technology, such as the 4th generation mobile communication (4G) technology or 5G technology. Alternatively, the V2X device 110 may support the next-generation mobile communication technology of 5G technology. For example, the V2X device 110 may be a vehicle-mounted communication device, for example, a trip computer with a wireless communication function, or a wireless communication device connected to the trip computer.

Alternatively, the V2X device 110 may be a roadside device, for example, a street lamp, a signal lamp, or other roadside devices with a wireless communication function. Further, the V2X device 110 may be a user terminal device, such as a mobile phone (or "cellular" phone) and a computer with a mobile terminal. For example, the V2X device 110 may be a portable mobile device, pocket-sized mobile device, handheld mobile device, a mobile device with a built-in computer or a vehicle mounted mobile device. For example, the V2X device 110 may be a station (STA), a subscriber unit, a subscriber station, a mobile station, a mobile, a remote station, an access point, a remote terminal, an access terminal, a user terminal, a user agent, a user device, or a user equipment (UE). For example, the V2X device 110 may specifically be a mobile terminal such as a smart phone, a tablet computer, an e-book reader, or it may be a smart wearable device such as smart glasses, a smart watch, or a smart bracelet.

Figure 2:
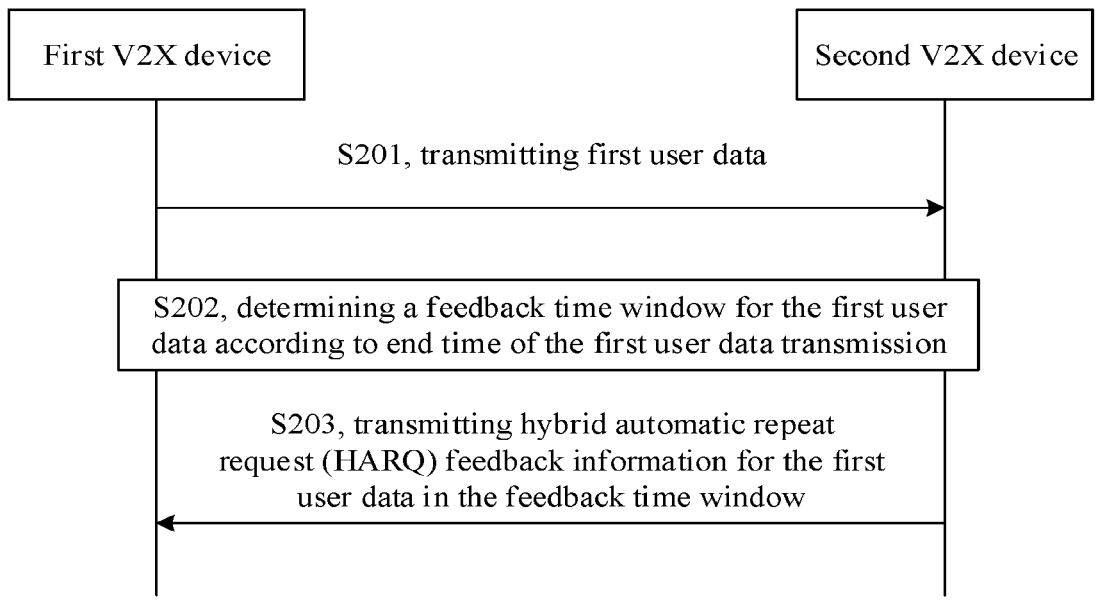
FIG. 2 is a flowchart of a method for feedback information transmission between V2X devices according to an exemplary embodiment.

FIG. 2 is a flowchart of a method for feedback information transmission between V2X devices according to an exemplary embodiment. Referring to FIG. 2, in the application scenario related to the method for feedback information transmission between V2X devices shown in FIG. 1, the method may include the following steps.

In step 201, a first V2X device transmits first user data to a second V2X device, and the second V2X device receives the first user data.

In step 202, the first V2X device and the second V2X device respectively determine a feedback time window for the first user data according to end time of the first user data transmission.

In step 202, the second V2X device transmits hybrid automatic repeat request (HARQ) feedback information for the first user data to the first V2X device in the feedback time window for the first user data, and the first V2X device receives the HARQ feedback information in the feedback time window for the first user data.

In the uplink and downlink communication of LTE and NR, the HARQ mechanism at the physical layer is used to ensure the integrity and reliability of data transmission for uplink and downlink unicast communication. For the uplink and downlink unicast communication of NR/LTE, there is a base station as a central node. All the uplink and downlink data transmission and feedback information transmission are scheduled by the central node. And the base station side ensures that no time-frequency resource collision occurs between the transmissions of HARQ feedback information and also between the transmissions of the HARQ feedback information and data.

However, in V2X, since there is no central node, the time-frequency resources used for data transmission are usually selected by the transmitter autonomously. Each V2X device only knows its own local information and cannot control the resource usage of other users. Therefore, in order to support HARQ feedback in V2X, it is necessary to reconsider how to correlate the feedback information with the corresponding data, and how to schedule the time-frequency resources for the feedback information.

In the solutions illustrated in embodiments of the present disclosure, there is no need to provide a dedicated central node for scheduling the resources used for the HARQ feedback information between the first V2X device and the second V2X device. After receiving the user data, the second V2X device on the receiver side determines a time window for transmitting the HARQ feedback information for the user data according to the end time of the user data transmission, and transmits the HARQ feedback information in the determined time window.

Correspondingly, the first V2X device on the transmitter side also determines the time window for transmitting the HARQ feedback information for the user data according to the end time of the user data transmission, and receives the HARQ feedback information in the determined time window.

In summary, after the first user data is transmitted by the first V2X device to the second V2X device, the second V2X device determines the feedback time window for transmitting the HARQ feedback information for the first user data according to the end time of the first user data transmission, and transmits the HARQ feedback information for the first user data in the determined feedback time window. Correspondingly, the first V2X device also receives the HARQ feedback information transmitted by the second V2X device in the same feedback time window, that is, the transmission time window for the feedback information is determined by the end time of the user data transmission, and there is no need to provide a central node to schedule the feedback resources, which realizes the support for HARQ feedback in the V2X communication.

Figure 3:
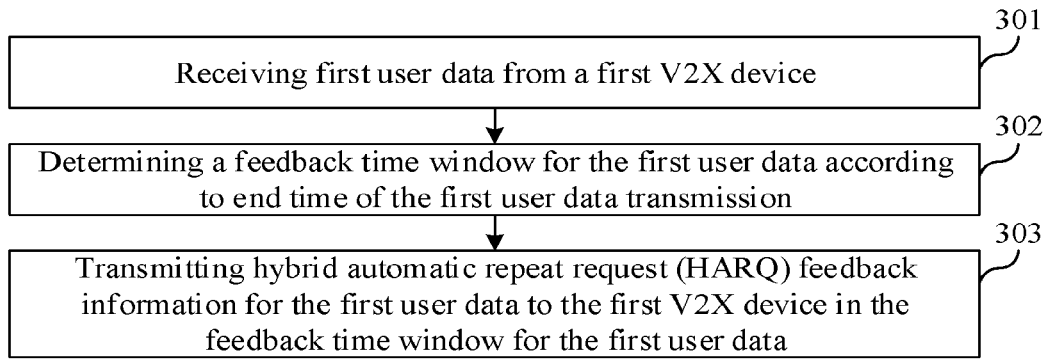
FIG. 3 is a flowchart of a method for feedback information transmission between V2X devices according to an exemplary embodiment.

FIG. 3 is a flowchart of a method for feedback information transmission between Vehicle to Everything (V2X) devices according to an exemplary embodiment. The method may be performed by the second V2X device in the embodiment shown in FIG. 2, and the method may include the following steps.

In step 301, a second V2X device receives first user data from a first V2X device.

In step 302, the second V2X device determines a feedback time window for the first user data according to end time of the first user data transmission.

In step 303, the second V2X device transmits hybrid automatic repeat request (HARQ) feedback information for the first user data to the first V2X device in the feedback time window for the first user data.

Alternatively, the operation that the second V2X device determines the feedback time window for the first user data according to the end time of the first user data transmission includes that the second V2X device acquires time window offset information indicating an offset duration between a low boundary or an upper boundary of the feedback time window for the first user data and the end time of the first user data transmission. It can further include that the second V2X device determines the feedback time window for the first user data according to the time window offset information and the end time of the first user data transmission.

Alternatively, the operation that the second V2X device acquires the time window offset information includes that the second V2X device acquires the time window offset information that is preset, or the second V2X device acquires the time window offset information that corresponds to a service type of the first user data, or the second V2X device acquires the time window offset information that corresponds to a subcarrier spacing of a time-frequency resource for the first user data, or the second V2X device acquires offset indication information carried in scheduling control information for the first user data, and acquires the time window offset information indicated by the offset indication information.

Additionally, the operation that the second V2X device transmits the HARQ feedback information for the first user data to the first V2X device in the feedback time window for the first user data can include that the second V2X device transmits, in the feedback time window for a last retransmission of the first user data, the HARQ feedback information for the first user data, in response to that the first user data is data to be retransmitted, or for each retransmission of the first user data, the second V2X device transmits the HARQ feedback information for a retransmission of the first user data in a feedback time window corresponding to the retransmission of the first user data, in response to that the first user data is data to be retransmitted.

Alternatively, the operation that the second V2X device transmits the HARQ feedback information for the first user data to the first V2X device in the feedback time window for the first user data includes that the second V2X device detects a target time-frequency resource that satisfies a feedback condition in the feedback time window for the first user data, and the second V2X device transmits the HARQ feedback information for the first user data on the target time-frequency resource.

Alternatively, the feedback condition includes at least one of the following conditions a value of signal energy of a corresponding time-frequency resource detected by the second V2X device being less than a preset signal energy threshold, the value of the signal energy of the corresponding time-frequency resource detected by the second V2X device being a minimum one among values of the signal energy of all time-frequency resources in the same time-domain, the second V2X device not transmitting data other than the HARQ feedback information on a corresponding time domain resource or a corresponding time-frequency resource, and the corresponding time-frequency resource is the time-frequency resource indicated by feedback resource indication information carried in scheduling control information for the first user data.

Alternatively, in response to that the feedback time window for the first user data overlaps with a feedback time window for at least one second user data, the operation that the second V2X device transmits the HARQ feedback information for the first user data to the first V2X device in the feedback time window for the first user data includes that the second V2X device acquires an overlapping time window of the feedback time window for the first user data and the feedback time window for the at least one second user data, the second V2X device acquires combined information of the HARQ feedback information for the first user data and HARQ feedback information for the at least one second user data, and the second V2X device transmits the combined information in the overlapping time window.

The operation that the second V2X device transmits the HARQ feedback information for the first user data to the first V2X device in the feedback time window for the first user data can include that the second V2X device transmits the HARQ feedback information including data indication information in the feedback time window for the first user data. The data indication information can include an address of the first V2X device, an address of the second V2X device, and a HARQ process identifier, or the data indication information includes the address of the first V2X device and the address of the second V2X device, or the data indication information includes a time-frequency location of the first user data.

In summary, in the solution illustrated in embodiments of the present disclosure, after the first user data is transmitted by the first V2X device to the second V2X device, the second V2X device determines the time window for transmitting the HARQ feedback information for the first user data according to the end time of the first user data transmission, and transmits the HARQ feedback information for the first user data in the determined time window. Thus, the first V2X device can receive the HARQ feedback information in the same time window, that is, the receiver and the transmitter of the V2X devices can automatically determine the time window for transmitting/receiving HARQ feedback information according to the end time of the user data transmission, which realizes the support for HARQ feedback in the V2X communication.

Figure 4:
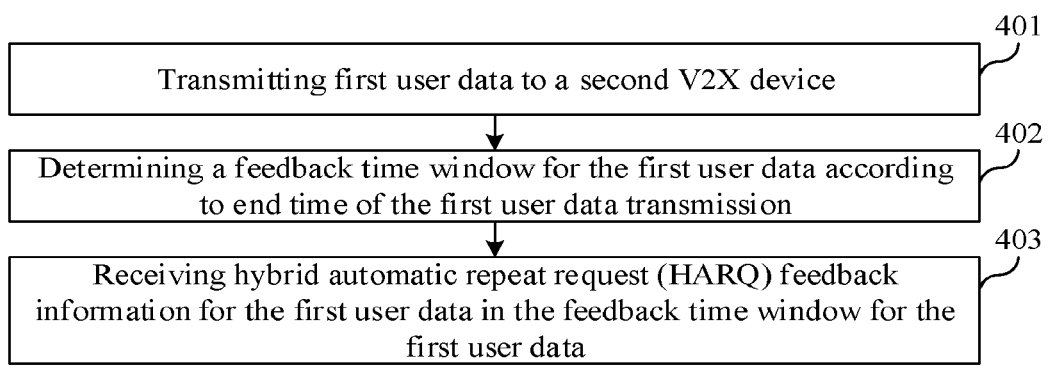
FIG. 4 is a flowchart of a method for feedback information transmission between V2X devices according to an exemplary embodiment.

FIG. 4 is a flowchart of a method for feedback information transmission between Vehicle to Everything (V2X) devices according to an exemplary embodiment. The method may be performed by the second V2X device in the embodiment shown in FIG. 2, and the method may include the following steps.

In step 401, a first V2X device transmits first user data to a second V2X device.

In step 402, the first V2X device determines a feedback time window for the first user data according to end time of the first user data transmission.

In step 403, the first V2X device receives hybrid automatic repeat request (HARQ) feedback information for the first user data in the feedback time window for the first user data.

Alternatively, the operation that the first V2X device receives the HARQ feedback information for the first user data in the feedback time window for the first user data can include that the first V2X device monitors the HARQ feedback information for the first user data on each available time-frequency resource within the feedback time window for the first user data.

Alternatively, the operation that the first V2X device receives the HARQ feedback information for the first user data in the feedback time window for the first user data includes the first V2X device receives the HARQ feedback information including data indication information in the feedback time window for the first user data. The data indication information can include an address of the first V2X device, an address of the second V2X device, and a HARQ process identifier; or, the data indication information includes the address of the first V2X device and the address of the second V2X device, or the data indication information includes a time-frequency location of the first user data.

In summary, in the solution illustrated in embodiments of the present disclosure, after the first user data is transmitted by the first V2X device to the second V2X device, the first V2X device determines the time window in which the second V2X device transmits the HARQ feedback information for the first user data, according to the end time of the first user data transmission, and receives the HARQ feedback information in the determined feedback time window. That is, the receiver and the transmitter of the V2X devices can automatically determine the time window for transmitting/receiving HARQ feedback information according to the end time of the user data transmission, which realizes the support for HARQ feedback in the V2X communication.

Figure 5:
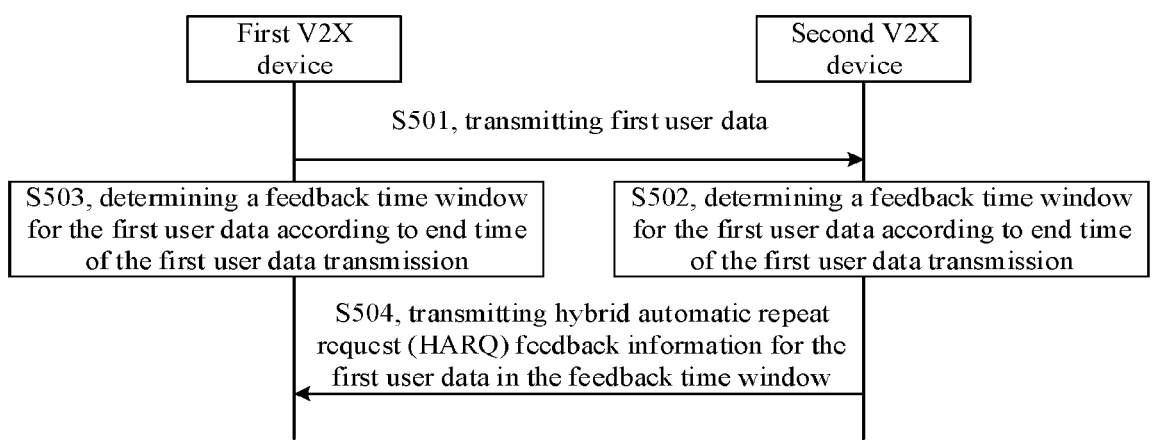
FIG. 5 is a flowchart of a method for feedback information transmission between V2X devices according to an exemplary embodiment.

FIG. 5 is a flowchart of a method for feedback information transmission between Vehicle to Everything (V2X) devices according to an exemplary embodiment. Referring to FIG. 5, in the application scenario related to the method for feedback information transmission between V2X devices shown in FIG. 1, the method may include the following steps.

In step 501, a first V2X device transmits first user data to a second V2X device, and the second V2X device receives the first user data. The first V2X device may transmit the first user data to the second V2X device through a sidelink. Herein, sidelink is a direct link between devices. Correspondingly, the second V2X device may receive the first user data transmitted by the first V2X device through the sidelink. When the first V2X device transmits the first user data, the first V2X device further transmits scheduling control information corresponding to the first user data.

Figure 6:
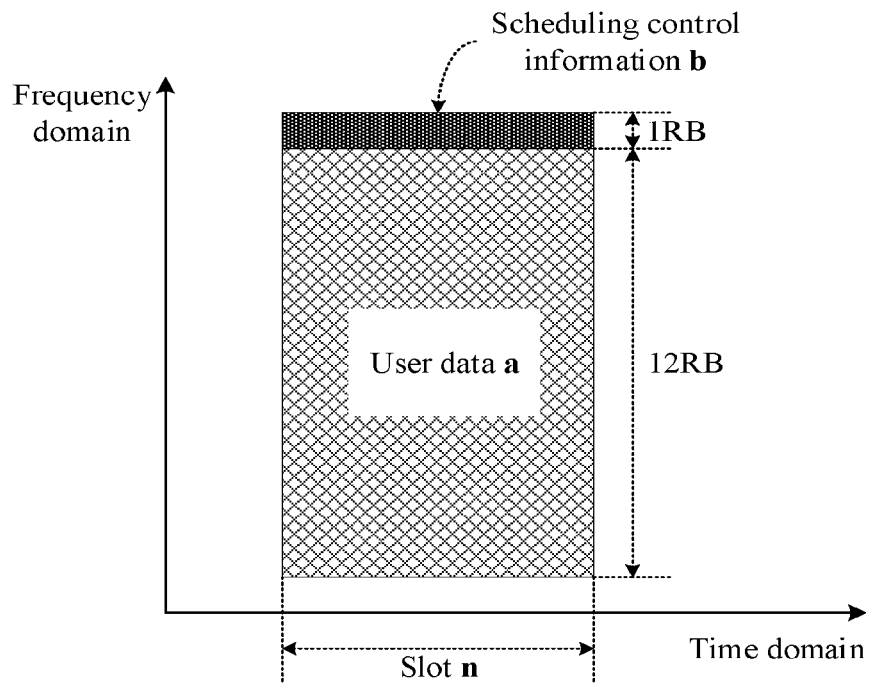
FIG. 6 is a schematic diagram of resource occupation of user data and scheduling control information related to the embodiment shown in FIG. 5.

In a possible implementation, the foregoing first user data and the scheduling control information for the first user data may be adjacent in frequency-domain and within the same time-domain. For example, referring to FIG. 6, a schematic diagram of resource occupation of user data and scheduling control information related to an embodiment of the present disclosure is illustrated. As shown in FIG. 6, user data a occupies 12 Resource Blocks (RBs) in frequency-domain and scheduling control information b for the user data a occupies 1 RB in frequency-domain, the user data a and the scheduling control information b are adjacent in frequency-domain. In addition, the user data a and the scheduling control information b are within a same slot n in time-domain.

In step 502, the second V2X device determines a feedback time window for the first user data according to end time of the first user data transmission.

Alternatively, when the second V2X device determines the feedback time window for the first user data according to the end time of the first user data transmission, time window offset information may be acquired. Herein, the time window offset information indicates an offset duration between a low boundary or an upper boundary of the feedback time window for the first user data and the end time of the first user data transmission. Then, the feedback time window for the first user data is determined according to the time window offset information and the end time of the first user data transmission.

In embodiments of the present disclosure, the feedback time window may be [t+T1, t+T2], where T1 and T2 are defined as delays (also known as the offset durations) of the end time t of the first user data transmission, and 0≤T1<T2. That is, the aforementioned feedback time window is after the end time of the first user data transmission in time-domain.

In embodiments of the present disclosure, the second V2X device may acquire the time window offset information by following manners.

1) The second V2X device acquires the time window offset information that is preset.

In a possible implementation, the aforementioned time window offset information may be fixed information that is preset, and the time window offset information may be preset in the V2X device, or be pre-configured in the V2X device by the base station side. For example, fixed values of T1 and T2 may be preset in each V2X device, or the base station side may pre-configure T1 and T2 as fixed values in each V2X device. The second V2X device acquires the time window offset information that corresponds to a service type of the first user data.

Since different services have different requirements for service characteristics such as delay, different values of T1 and T2 may be configured for user data in different service types in the V2X device. Here, the manner for configuring the values may be: pre-configured in the V2X device, or configured by the base station through downlink control signaling. The different values of (T1, T2) may be configured corresponding to the service priority classes of different user data. For example, in a possible implementation, the values of (T1, T2) may be configured as:

Priority class 0 (highest)↔T1=1 symbol, T2=ms;
Priority class 1↔T1=1 symbol, T2=4 ms;
. . .
Priority class 15 (lowest)↔T1=1 symbol, T2=20 ms.

The second V2X device acquires the time window offset information that corresponds to a subcarrier spacing of a time-frequency resource for the first user data.

In another possible implementation, the values of T1 and T2 may also be configured according to different subcarrier spacings of data transmission in the V2X device. For example, the values of (T1, T2) may be configured as:

if the subcarrier spacing is 15 KHz, T1=1 symbol, T2=1 ms;
if the subcarrier spacing is 30 KHz, T1=1 symbol, T2=0.5 ms.

The second V2X device acquires offset indication information carried in scheduling control information for the first user data, and acquires the time window offset information indicated by the offset indication information.

In another possible implementation, the device in the transmitter side (i.e. the first V2X device) may include the indication (i.e. the abovementioned offset indication information) of the values of T1 and T2 corresponding to the user data in the control signaling (i.e. the scheduling control information) for scheduling user data transmission, and the device in the receiver side (i.e. the second V2X device) may determine the values of T1 and T2 according to the received scheduling control information.

Herein, the indication in the control signaling of the scheduling control information may be an explicit indication bit, for example, 2 bits are used to indicate 4 different configuration values of (T1, T2). Or, the indication in the control signaling of the scheduling control information may be an implicit indication, for example, the control signaling contains 3 bits of priority indication, which are used to indicate the priority class of user data, and different priority classes of the user data may be mapped to different configuration values of (T1, T2).

When the first V2X device transmits the user data and the scheduling control information for the user data, a same piece of data may be transmitted multiple times on different time-frequency resources, which is also called repetition. For example, in LTE, the data transmitter generally transmits the same piece of data twice on different time-frequency resources, and the second user data transmission is a retransmission of the first user data.

In embodiments of the present disclosure, in the case of data retransmission, the second V2X device may transmit the HARQ feedback information in the following two manners.

A) For each retransmission of the first user data, the second V2X device transmits the HARQ feedback information for a retransmission of the first user data in a feedback time window corresponding to the retransmission of the first user data, in response to that the first user data is data to be retransmitted.

Figure 7:
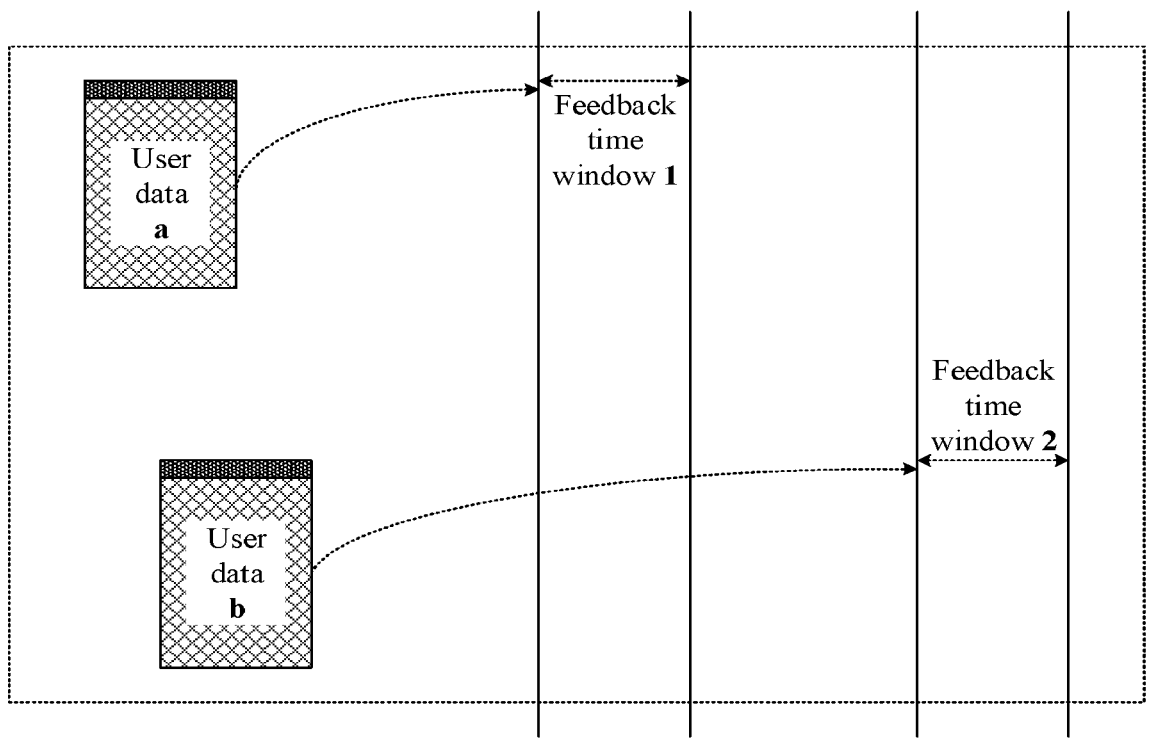
FIG. 7 is a schematic diagram of a manner of HARQ feedback information transmission related to the embodiment shown in FIG. 5.

For example, referring to FIG. 7, a schematic diagram of a manner of HARQ feedback information transmission related to an embodiment of the present disclosure is illustrated. As shown in FIG. 7, user data a and user data b represent two transmissions of the same user data. The user data a represents the first transmission and the user data b represents the second transmission. The time-frequency resources for the user data a and the scheduling control information for the user data a are different from the time-frequency resources for the user data b and the scheduling control information for the user data b. The HARQ feedback information for the user data a corresponds to a feedback time window 1, and the HARQ feedback information for the user data b corresponds to a feedback time window 2. After receiving the user data a and user data b, the V2X device transmits the HARQ feedback information for the user data a in the feedback time window 1, and transmits the HARQ feedback information for the user data b in the feedback time window 2.

Figure 8:
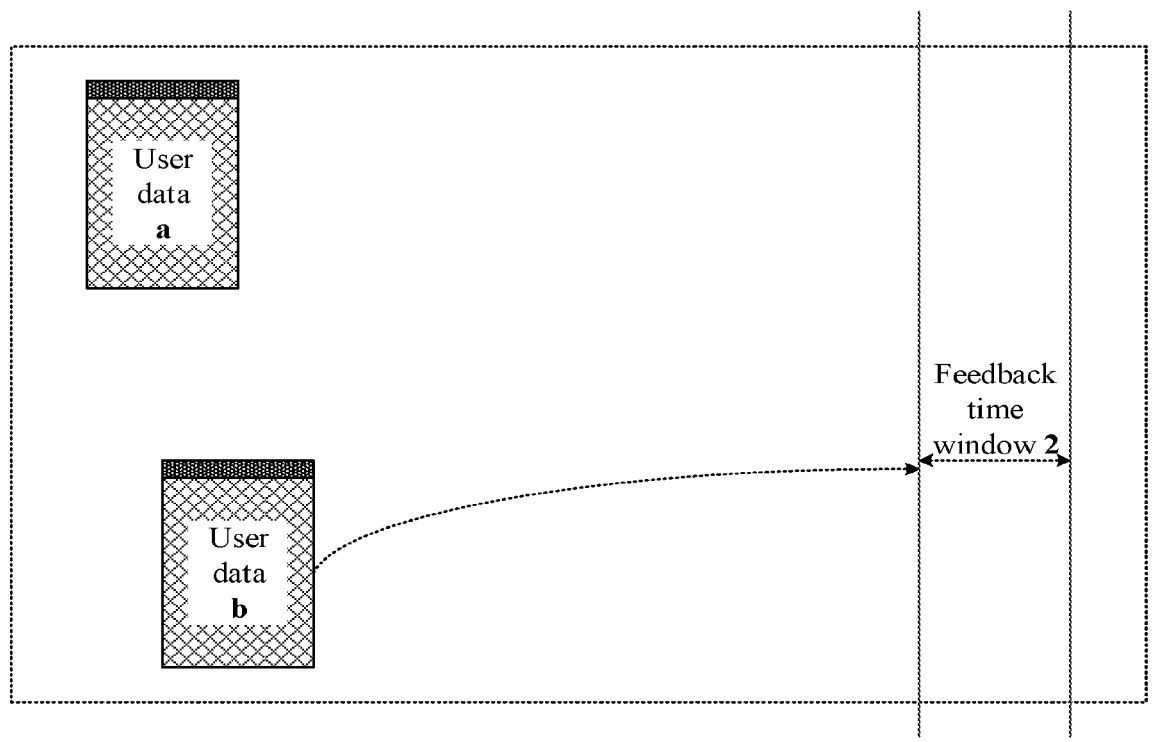
FIG. 8 is a schematic diagram of another manner of HARQ feedback information transmission related to the embodiment shown in FIG. 5.

B) In the feedback time window for the last retransmission of the first user data, the HARQ feedback information for the first user data is transmitted, in response to that the first user data is data to be retransmitted. For example, referring to FIG. 8, a schematic diagram of another manner of HARQ feedback information transmission related to an embodiment of the present disclosure is illustrated. As shown in FIG. 8, user data a and user data b represent two transmissions of the same user data. The user data a represents the first transmission and the user data b represents the second transmission. The HARQ feedback information for the user data a corresponds to a feedback time window 1, and the HARQ feedback information for the user data b corresponds to a feedback time window 2. As shown in FIG. 8, after receiving the user data a and user data b, the HARQ feedback information for the user data a is not transmitted in the feedback time window 1, and only the HARQ feedback information for the user data b is transmitted in the feedback time window 2.

Alternatively, when the second V2X device transmits the HARQ feedback information for the first user data to the first V2X device in the feedback time window for the first user data, the second V2X device detects a target time-frequency resource that satisfies a feedback condition in the feedback time window for the first user data, then transmits the HARQ feedback information for the first user data on the target time-frequency resource.

Since there may be more time-frequency resources contained in the feedback time window, only a small part of the time-frequency resources need to be used for transmitting the HARQ feedback information for the first user data, a specific time-frequency resource (that is, the target time-frequency resource) used for transmitting the HARQ feedback information in the feedback time window may be determined by the second V2X device. It should be noted that the aforementioned target time-frequency resource has to be located in the feedback time window, that is, the first symbol for transmitting HARQ feedback information is not earlier than t+T1, and the last time-domain symbol for transmitting HARQ feedback information is not later than t+T2.

Alternatively, the feedback condition includes at least one of the following conditions.

1) A value of signal energy of a corresponding time-frequency resource detected by the second V2X device is less than a preset signal energy threshold.

The second V2X device may acquire the resource occupancy of other adjacent V2X devices by sensing, that is, receiving control/data signals transmitted by other V2X devices and/or measuring signal energy on time-frequency resources. When selecting the time-frequency resources for the HARQ feedback information, the second V2X device excludes the time-frequency resources that are sensed as being occupied by other control information/data transmission, and selects the time-frequency resources in which the signal energy is less than the preset signal energy threshold (that is, the time-frequency resources not occupied by other control information/data transmission), to avoid interference between the HARQ feedback information and other transmission.

2) The value of the signal energy of a corresponding time-frequency resource detected by the second V2X device is a minimum one among values of the signal energy of all time-frequency resources in a same time-domain.

In embodiments of the present disclosure, when spare time-frequency resources within the feedback time window are insufficient, the second V2X device may preferentially exclude the time-frequency resources that are expected to have strong interference (that is, the measured signal energy is higher), and select a time-frequency resource with the lowest measured signal energy among the spare time-frequency resources as the target time-frequency resource. Or, the second V2X device may select one or part of a plurality of time-frequency resources with low measured signal energy among the spare time-frequency resources as the target time-frequency resource. For example, the plurality of time-frequency resources with low signal energy mentioned above may be the last 5% of the time-frequency resources with the lowest signal energy among the spare time-frequency resources.

3) The second V2X device does not transmit data other than the HARQ feedback information on a corresponding time-domain resource or a corresponding time-frequency resource.

In order to avoid an increase of Peak to Average Power Ratio (PAPR, referred to as peak to average ratio for short) of the signal caused by transmitting a plurality of frequency-domain multiplexed signals in the same time-domain, when selecting the time-frequency resource for transmitting the HARQ feedback information, the second V2X device may exclude the time-frequency resources that overlaps with other data/control information transmitted by the second V2X device in time-domain. And in the feedback time window, the time-frequency resource in which the second V2X device does not transmit the other data/control information on the corresponding time-frequency resource is selected as the target time-frequency resource.

4) Herein, the corresponding time-frequency resource is the time-frequency resource indicated by feedback resource indication information carried in scheduling control information for the first user data.

In embodiments of the present disclosure, the first V2X device may also indicate a set of time-frequency resources for being selected to the second V2X device through scheduling control information or other direct communication control information. When the second V2X device transmits the HARQ feedback information in the feedback time window, the second V2X device may take a time-frequency resource within the set of time-frequency resources for being selected in the feedback time window as the target time-frequency resource.

Alternatively, in response to that the feedback time window for the first user data overlaps with a feedback time window for at least one second user data, the second V2X device may acquire an overlapping time window between the feedback time window for the first user data and the feedback time window for the at least one second user data, acquire combined information of the HARQ feedback information for the first user data and HARQ feedback information for the at least one second user data, and transmit the combined information in the overlapping time window.

In embodiments of the present disclosure, when two or more feedback time windows for different user data overlap in time-domain, HARQ feedback information for the two or more user data can be transmitted as a combined transmission, and locations of time-frequency resources used for the combined transmission should be in the overlapping range of the feedback time windows for the two or more user data. Herein, the several pieces of the HARQ feedback information may be sequenced according to an order of the time-frequency resources corresponding to the different user data. For example, the several pieces of the HARQ feedback information may be sequenced in a chronological order of the end time of the transmissions. And if several pieces of the HARQ feedback information have the same end time of transmissions, the several pieces of the HARQ feedback information may be sequenced in a descending order of the starting positions of the frequency resources occupied by the transmissions.

Figure 9:
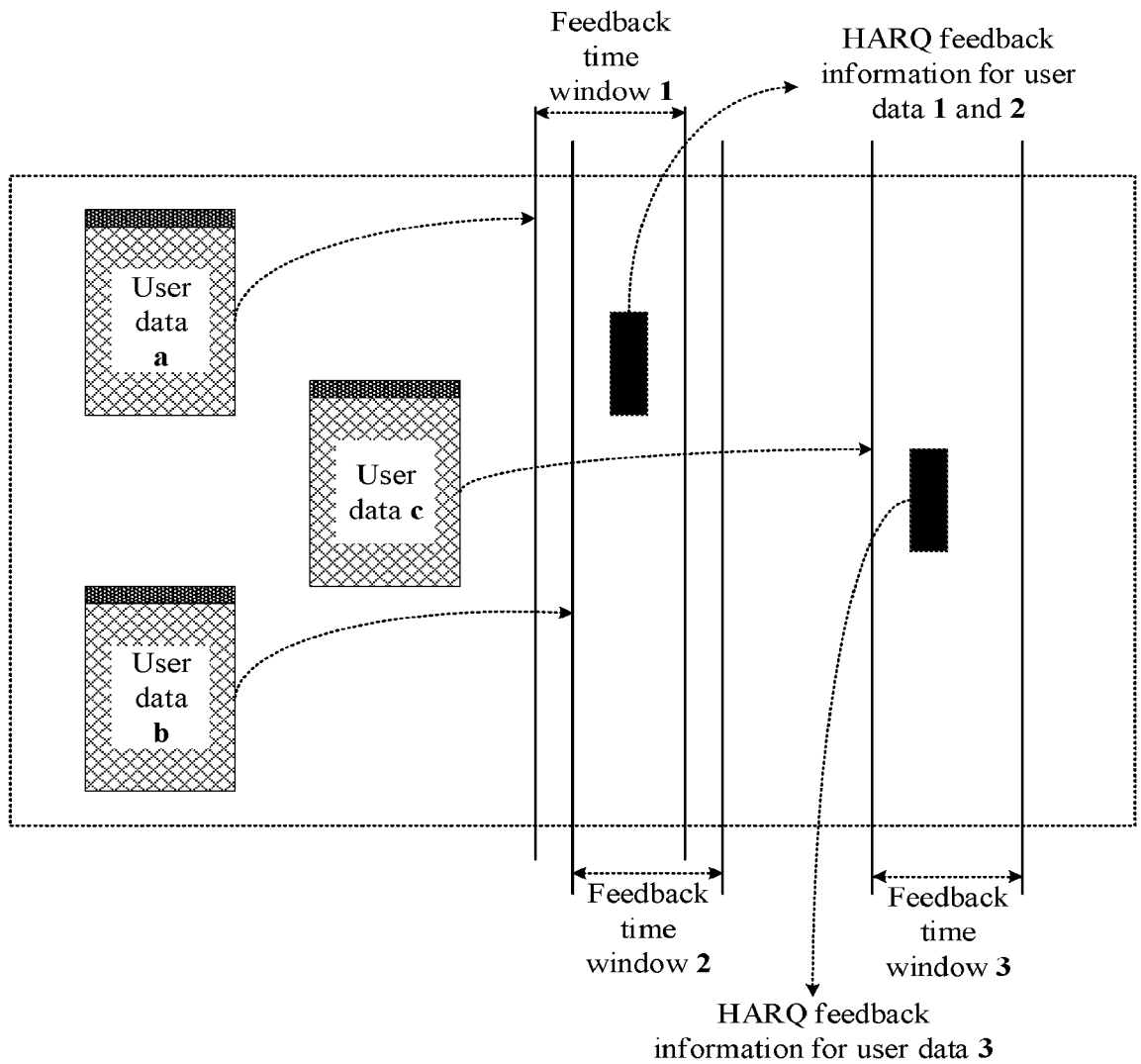
FIG. 9 is a schematic diagram of another manner of HARQ feedback information transmission related to the embodiment shown in FIG. 5.

For example, referring to FIG. 9, a schematic diagram of a manner of HARQ feedback information transmission related to an embodiment of the present disclosure is illustrated. As shown in FIG. 9, the feedback time window for user data 1 and the feedback time window for user data 2 overlap. The second V2X device combines the HARQ feedback information for the user data 1 and user data 2, and transmits the combined HARQ feedback information in the overlapping part between the feedback time window for the user data 1 and the feedback time window for user data 2. And if feedback time window for user data 3 does not overlap with the feedback time windows for the user data 1 and 2, the second V2X device transmits the HARQ feedback information for the user data 3 in the feedback time window for the user data 3.

In step 503, the first V2X device determines a feedback time window for the first user data according to end time of the first user data transmission. Herein, the manner that the first V2X device determines the feedback time window for the first user data is similar to the manner that the second V2X device determines the feedback time window for the first user data. The details for the manner have been described in the description of the step 502 above, which will not be repeated here.

The exemplary embodiments of the present disclosure do not limit the execution order of the aforementioned steps 502 and 503, in practical applications, after acquiring the end time of the first user data transmission, the first V2X device or the second V2X device may determine the feedback time window for the first user data according to the end time of the first user data transmission.

In step 504, the second V2X device transmits the HARQ feedback information for the first user data in the feedback time window for the first user data; and the first V2X device receives the HARQ feedback information for the first user data in the feedback time window for the first user data.

Alternatively, the first V2X device monitors the HARQ feedback information for the first user data on each available time-frequency resource within the feedback time window for the first user data.

In embodiments of the present disclosure, the first V2X device may monitor all possible feedback information in the feedback time window, and determine the feedback information corresponding to the first user data according to the monitored feedback information.

Alternatively, when the second V2X device transmits the HARQ feedback information for the first user data to the first V2X device in the feedback time window for the first user data, the HARQ feedback information including data indication information can be transmitted in the feedback time window for the first user data. Correspondingly, when the first V2X device receives the HARQ feedback information for the first user data in the feedback time window for the first user data, the HARQ feedback information including the data indication information can be received in the feedback time window for the first user data. And it can determined whether the HARQ feedback information is the HARQ feedback information for the first user data according to the data indication information in the received HARQ feedback information.

Herein, the data indication information includes one of the following.

1) The data indication information includes an address of the first V2X device, an address of the second V2X device, and a HARQ process identifier.

In embodiments of the present disclosure, the second V2X device may include the physical layer addresses of the user data transmitter (i.e. the first V2X device) and the user data receiver (i.e. the second V2X device) in the HARQ feedback information. The first V2X device may determine a direct link for data transmission of the feedback information, according to these two addresses.

Figure 10:
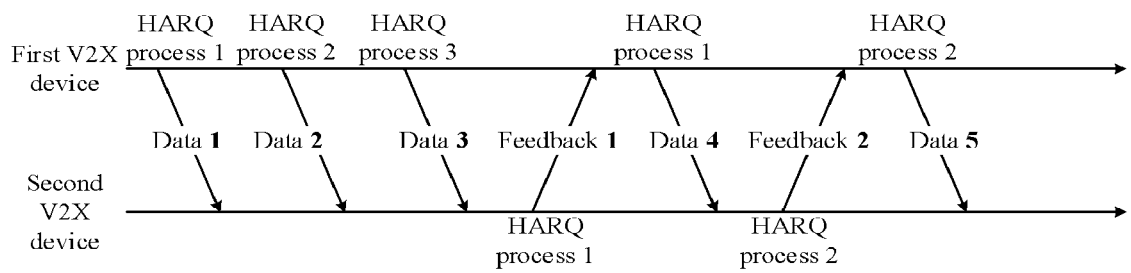
FIG. 10 is a timing diagram of a manner of user data transmission related to the embodiment shown in FIG. 5.

Specifically, for different data transmissions on the same direct link, different HARQ process IDs (IDentities) can be used to identify the user data. For the user data of the same HARQ process, the first V2X device transmits the new user data only after successful reception feedbacks of all the previously transmitted data have been received. Referring to FIG. 10, a timing sequence diagram of user data transmission related to the embodiment of the present disclosure is illustrated. As shown in FIG. 10, the transmission timing sequence of different HARQ processes on a same direct link is as follows.

Firstly, the first V2X device successively transmits data 1 corresponding to a HARQ process 1, data 2 corresponding to a HARQ process 2, and data 3 corresponding to a HARQ process 3. After that, when the second V2X device returns HARQ feedback information (i.e. feedback 1) for the data 1, the first V2X device transmits a next data (i.e. data 4) corresponding to the HARQ process 1. Correspondingly, when the second V2X device returns HARQ feedback information (i.e. feedback 2) for the data 2, the first V2X device transmits next data (i.e. data 5) corresponding to the HARQ process 2, and so on.

At this time, when the second V2X device includes the HARQ process ID corresponding to the user data in the feedback information, the first V2X device can confirm the user data corresponding to the feedback information based on the address of the data transmitter, the address of the data receiver and the HARQ process ID. Herein, examples of the feedback message format are as follows: address of data transmitter, address of data receiver. HARQ ID, feedback codebook.

2) The data indication information includes the address of the first V2X device and the address of the second V2X device.

In a possible implementation, different feedback times may be used to distinguish data from the same link. For example, when the data transmitter (corresponding to the first V2X device) transmits the user data, it ensures that the feedback time windows for different user data on the same direct link do not overlap in time-domain. For example, after the first V2X device transmits user data on a direct link, the feedback time window for the user data can be determined. After that, when the first V2X device transmits next user data on the same direct link, the first V2X device can select a specific time-frequency resource to transmit the next user data. In addition, there is no overlap between the feedback time window determined according to the end time of transmission of the specific time-frequency resource and the feedback time window for the user data which had been transmitted previously but with no feedback received. At this time, the second V2X device may not include the HARQ process ID corresponding to the user data in the feedback information. And the first V2X device can confirm the user data corresponding to the feedback information based on the address of the data transmitter, the address of the data receiver and the HARQ process ID.

3) The data indication information includes a time-frequency location of the first user data.

Figure 11:
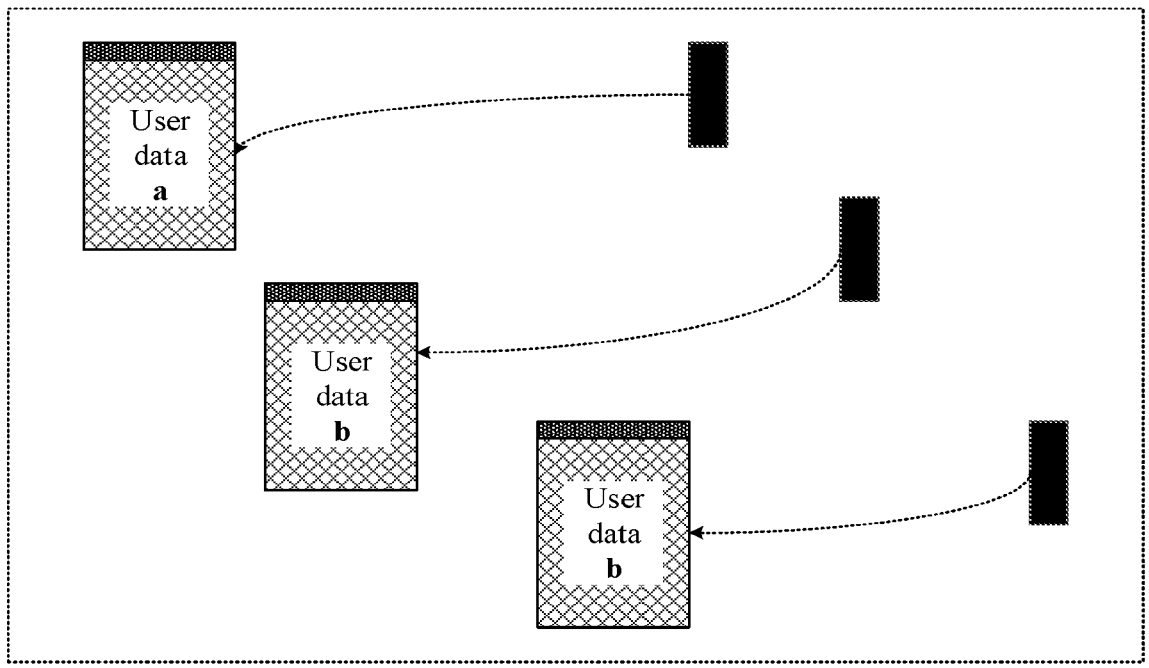
FIG. 11 is a schematic diagram of another manner of HARQ feedback information transmission related to the embodiment shown in FIG. 5.

In another possible implementation, the time-frequency resource location of the corresponding user data or the scheduling control information for the user data in the feedback information can be indicated in the feedback information, to distinguish different user data from the same link or from different direct links. For example, referring to FIG. 11, a schematic diagram of another manner for HARQ feedback information transmission related to the embodiment of the present disclosure is illustrated. As shown in FIG. 11, the second V2X device includes a bit for indicating the starting time-frequency position of the corresponding user data in the feedback information for each user data. The second V2X device may determine the user data corresponding to the detected feedback information according to the bit indicating the starting time-frequency position of the corresponding user data in the detected feedback information.

In summary, after the first user data is transmitted by the first V2X device to the second V2X device, the second V2X device determines the feedback time window for transmitting the HARQ feedback information for the first user data according to the end time of the first user data transmission, and transmits the HARQ feedback information for the first user data in the determined feedback time window. Correspondingly, the first V2X device also receives the HARQ feedback information transmitted by the second V2X device in the same feedback time window, that is, the transmission time window for the feedback information is determined by the end time of the user data transmission, and there is no need to provide a central node to schedule the feedback resources, which realizes the support for HARQ feedback in the V2X communication.

The following are apparatus embodiments of the present disclosure, which can be used to perform the method embodiments of present disclosure. The details that are not disclosed in the apparatus embodiments of the present disclosure can be found in the method embodiments of the present disclosure.

Figure 12:
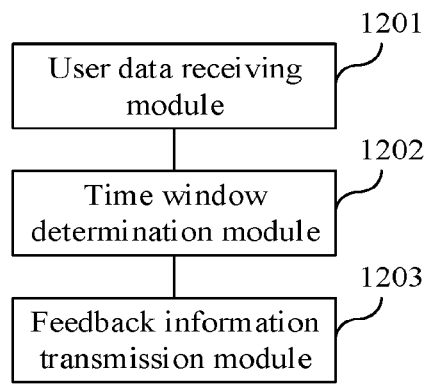
FIG. 12 is a block diagram illustrating an apparatus for feedback information transmission between V2X devices according to an exemplary embodiment.

FIG. 12 is a block diagram illustrating an apparatus for feedback information transmission between Vehicle to Everything (V2X) devices according to an exemplary embodiment. As shown in FIG. 12, the apparatus for feedback information transmission between V2X devices may be implemented as all or part of the V2X devices in the application scenario shown in FIG. 1 through hardware or combination of software and hardware, to perform the steps performed by the second V2X device in any of the embodiments shown in FIG. 2, 3 or 5. The apparatus for feedback information transmission between V2X devices may include a user data receiving module 1201, a time window determination module 1202, and a feedback information transmission module 1203. Of course, it should be understood that one or more of the modules described in this description can by implemented by hardware, such as circuitry.

The user data receiving module 1201 is configured to receive first user data from a first V2X device.

The time window determination module 1202 is configured to determine a feedback time window for the first user data according to end time of the first user data transmission.

The feedback information transmission module 1203 is configured to transmit hybrid automatic repeat request (HARQ) feedback information for the first user data to the first V2X device in the feedback time window for the first user data.

Alternatively, the time window determination module 1202 is specifically configured to acquire time window offset information indicating an offset duration between a lower boundary or an upper boundary of the feedback time window for the first user data and the end time of the first user data transmission, and determine the feedback time window for the first user data according to the time window offset information and the end time of the first user data transmission.

Alternatively, the second V2X device acquiring the time window offset information can include the second V2X device acquiring the time window offset information that is preset, or the second V2X device acquiring the time window offset information that corresponds to a service type of the first user data, or the second V2X device acquiring the time window offset information that corresponds to a subcarrier spacing of a time-frequency resource for the first user data, or the second V2X device acquiring offset indication information carried in scheduling control information for the first user data, and acquiring the time window offset information indicated by the offset indication information.

Alternatively, the feedback information transmission module 1203 can be configured to transmit, in the feedback time window for a last retransmission of the first user data, the HARQ feedback information for the first user data, in response to that the first user data is data to be retransmitted, or transmit, for each retransmission of the first user data, the HARQ feedback information for a retransmission of the first user data in a feedback time window corresponding to the retransmission of the first user data, in response to that the first user data is data to be retransmitted.

Alternatively, the feedback information transmission module 1203 is specifically configured to detect a target time-frequency resource that satisfies a feedback condition in the feedback time window for the first user data, and transmit the HARQ feedback information for the first user data on the target time-frequency resource.

Alternatively, the feedback condition includes at least one of the following conditions: a value of signal energy of a corresponding time-frequency resource detected by the second V2X device being less than a preset signal energy threshold, the value of the signal energy of the corresponding time-frequency resource detected by the second V2X device being a minimum one among values of the signal energy of all time-frequency resources in the same time-domain, the second V2X device not transmitting data other than the HARQ feedback information on a corresponding time domain resource or a corresponding time-frequency resource, and the corresponding time-frequency resource is the time-frequency resource indicated by feedback resource indication information carried in scheduling control information for the first user data.

Alternatively, the feedback information transmission module 1203 is specifically configured to acquire an overlapping time window of the feedback time window for the first user data and a feedback time window for at least one second user data, in response to that the feedback time window for the first user data overlaps with a feedback time window for at least one second user data, acquire combined information of the HARQ feedback information for the first user data and HARQ feedback information for the at least one second user data, and transmit the combined information in the overlapping time window.

Alternatively, the feedback information transmission module 1203 is specifically configured to transmit the HARQ feedback information including data indication information in the feedback time window for the first user data. The data indication information includes an address of the first V2X device, an address of the second V2X device, and a HARQ process identifier, or the data indication information includes the address of the first V2X device and the address of the second V2X device, or the data indication information includes a time-frequency location of the first user data.

In summary, in the solution shown in embodiments of the present disclosure, after the first user data is transmitted by the first V2X device to the second V2X device, the second V2X device determines the feedback time window for transmitting the HARQ feedback information for the first user data according to the end time of the first user data transmission, and transmits the HARQ feedback information for the first user data in the determined feedback time window. Thus, the first V2X device can receive the HARQ feedback information according to the same time window, that is, the receiver and the transmitter of the V2X devices can automatically determine the time window for transmitting/receiving HARQ feedback information according to the end time of the user data transmission, which realizes the support for HARQ feedback in the V2X communication.

Figure 13:
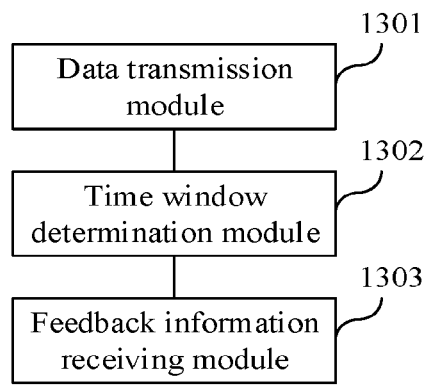
FIG. 13 is a block diagram illustrating an apparatus for feedback information transmission between V2X devices according to an exemplary embodiment.

FIG. 13 is a block diagram illustrating an apparatus for feedback information transmission between Vehicle to Everything (V2X) devices according to an exemplary embodiment. As shown in FIG. 13, the apparatus for feedback information transmission between V2X devices may be implemented as all or part of the V2X devices in the application scenario shown in FIG. 1 through hardware or combination of software and hardware, to perform the steps performed by the first V2X device in any of the embodiments shown in FIG. 2, 4 or 5. The apparatus for feedback information transmission between V2X devices may include a data transmission module 1301, a time window determination module 1302, and a feedback information receiving module 1303.

The data transmission module 1301 is configured to transmit first user data to a second V2X device.

The time window determination module 1302 is configured to determine a feedback time window for the first user data according to end time of the first user data transmission.

The feedback information receiving module 1303 is configured to receive hybrid automatic repeat request (HARQ) feedback information for the first user data in the feedback time window for the first user data.

Alternatively, the feedback information receiving module 1303 is specifically configured to monitor the HARQ feedback information for the first user data on each available time-frequency resource within the feedback time window for the first user data.

Alternatively, the feedback information receiving module 1303 is specifically configured to receive the HARQ feedback information including data indication information in the feedback time window for the first user data. The data indication information can include an address of the first V2X device, an address of the second V2X device, and a HARQ process identifier, or the data indication information includes the address of the first V2X device and the address of the second V2X device, or the data indication information includes a time-frequency location of the first user data.

In summary, in the solution illustrated in embodiments of the present disclosure, after the first user data is transmitted by the first V2X device to the second V2X device, the first V2X device determines the time window for the HARQ feedback information for the first user data transmitted by the second V2X device, according to the end time of the first user data transmission, and receives the HARQ feedback information in the determined feedback time window. That is, the receiver and the transmitter of the V2X devices can automatically determine the time window for transmitting/receiving HARQ feedback information according to the end time of the user data transmission, which realizes the support for HARQ feedback in the V2X communication.

An exemplary embodiment of the present disclosure also provides a system for feedback information transmission between Vehicle to Everything (V2X) devices, the system including: a first V2X device and a second V2X device. The first V2X device includes the apparatus for feedback information transmission between V2X devices provided in the embodiment shown in FIG. 13. The second V2X device includes the apparatus for feedback information transmission between V2X devices provided in the embodiment shown in FIG. 12.

It should be noted that, when the apparatus provided by the foregoing embodiments realize its function, the division of the foregoing functional modules is only used for illustration. In practical applications, the above-mentioned function allocation can be completed by different functional modules according to the actual needs. That is, the structure of the apparatus is divided into different functional modules to complete all or part of the functions described above.

Regarding the apparatus in the foregoing embodiments, the specific manner of the operations performed by each module has been described in detail in the embodiments of the method, and detailed description will not be given here.

An exemplary embodiment of the present disclosure also provides an apparatus for feedback information transmission between Vehicle to Everything (V2X) devices, which can implement all or part of the steps performed by the second V2X device in the embodiments shown in FIG. 2, 3 or 5 of the present disclosure. The apparatus for feedback information transmission between V2X devices includes a processor and a memory storing a computer program executable by the processor. The processor can be configured to receive first user data from a first V2X device, determine a feedback time window for the first user data according to end time of the first user data transmission, and transmit hybrid automatic repeat request (HARQ) feedback information for the first user data to the first V2X device in the feedback time window for the first user data.

Alternatively, the operation of determining the feedback time window for the first user data according to the end time of the first user data transmission includes acquiring time window offset information indicating an offset duration between a low boundary or an upper boundary of the feedback time window for the first user data and the end time of the first user data transmission, and determining the feedback time window for the first user data according to the time window offset information and the end time of the first user data transmission.

Alternatively, the operation of acquiring the time window offset information includes acquiring the time window offset information that is preset, or acquiring the time window offset information that corresponds to a service type of the first user data, or acquiring the time window offset information that corresponds to a subcarrier spacing of a time-frequency resource for the first user data, or acquiring offset indication information carried in scheduling control information for the first user data, and acquiring the time window offset information indicated by the offset indication information.

Alternatively, the operation of transmitting the HARQ feedback information for the first user data to the first V2X device in the feedback time window for the first user data can include transmitting, in the feedback time window for a last retransmission of the first user data, the HARQ feedback information for the first user data, in response to that the first user data is data to be retransmitted, or transmitting, for each retransmission of the first user data, the HARQ feedback information for a retransmission of the first user data in a feedback time window corresponding to the retransmission of the first user data, in response to that the first user data is data to be retransmitted.

Alternatively, the operation of transmitting the HARQ feedback information for the first user data to the first V2X device in the feedback time window for the first user data includes detecting a target time-frequency resource that satisfies a feedback condition in the feedback time window for the first user data, and transmitting the HARQ feedback information for the first user data on the target time-frequency resource.

Alternatively, the feedback condition includes at least one of the following conditions: a value of signal energy of a corresponding time-frequency resource detected by the second V2X device being less than a preset signal energy threshold; the value of the signal energy of the corresponding time-frequency resource detected by the second V2X device being a minimum one among values of the signal energy of all time-frequency resources in the same time-domain; the second V2X device not transmitting data other than the HARQ feedback information on a corresponding time domain resource or a corresponding time-frequency resource; and the corresponding time-frequency resource is the time-frequency resource indicated by feedback resource indication information carried in scheduling control information for the first user data.

Alternatively, in response to that the feedback time window for the first user data overlaps with a feedback time window for at least one second user data, the operation that the second V2X device transmits the HARQ feedback information for the first user data to the first V2X device in the feedback time window for the first user data include acquiring an overlapping time window of the feedback time window for the first user data and the feedback time window for the at least one second user data; acquiring combined information of the HARQ feedback information for the first user data and HARQ feedback information for the at least one second user data and transmitting the combined information in the overlapping time window.

Alternatively, the operation of transmitting the HARQ feedback information for the first user data to the first V2X device in the feedback time window for the first user data includes transmitting the HARQ feedback information including data indication information in the feedback time window for the first user data. The data indication information includes an address of the first V2X device, an address of the second V2X device, and a HARQ process identifier, or the data indication information includes the address of the first V2X device and the address of the second V2X device, or the data indication information includes a time-frequency location of the first user data.

An exemplary embodiment of the present disclosure also provides an apparatus for feedback information transmission between Vehicle to Everything (V2X) devices, which can implement all or part of the steps performed by the first V2X device in the embodiments shown in FIG. 2, 4 or 5 of the present disclosure. The apparatus for feedback information transmission between V2X devices includes a processor and a memory storing a computer program executable by the processor. The processor can be configured to transmit first user data to a second V2X device, determine a feedback time window for the first user data according to end time of the first user data transmission, and receive hybrid automatic repeat request (HARQ) feedback information for the first user data in the feedback time window for the first user data.

Alternatively, the operation of receiving the HARQ feedback information for the first user data in the feedback time window for the first user data includes monitoring the HARQ feedback information for the first user data on each available time-frequency resource within the feedback time window for the first user data.

Alternatively, the operation of receiving the HARQ feedback information for the first user data in the feedback time window for the first user data includes receiving the HARQ feedback information including data indication information in the feedback time window for the first user data. The data indication information includes an address of the first V2X device, an address of the second V2X device, and a HARQ process identifier, or the data indication information includes the address of the first V2X device and the address of the second V2X device, or the data indication information includes a time-frequency location of the first user data.

The foregoing mainly takes the V2X devices as an example to introduce the solutions provided by the embodiments of the present disclosure. It can be understood that, in order to realize the above-mentioned functions, the V2X devices include hardware structures and/or software modules corresponding to each function. In combination with the modules and algorithm steps of the examples described in the embodiments in the present disclosure, the embodiments of the present disclosure can be implemented in the form of hardware or combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as being beyond the scope of the technical solutions of the embodiments of the present disclosure.

Figure 14:
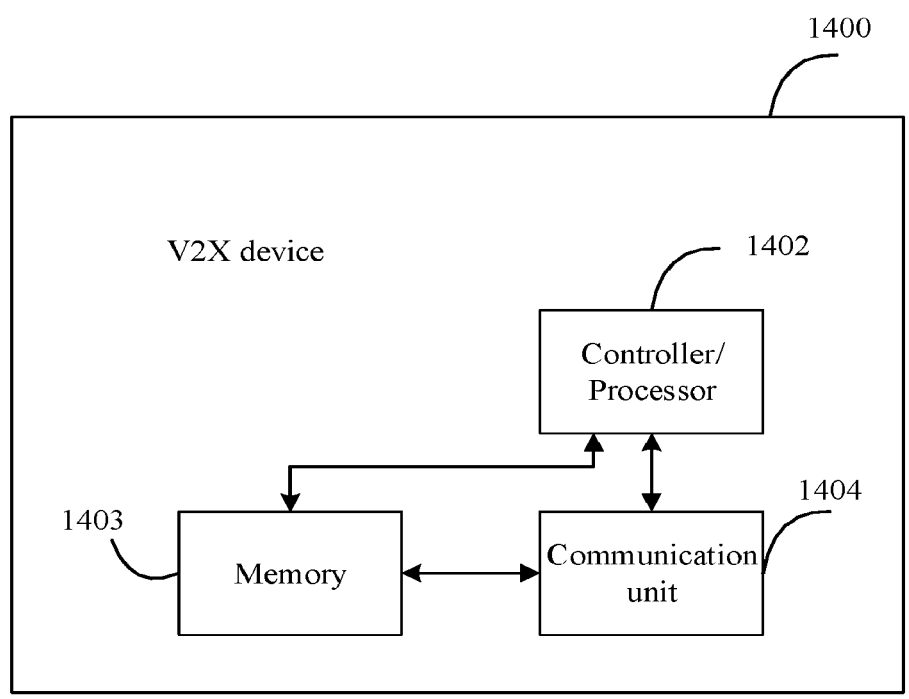
FIG. 14 is a schematic structural diagram of a V2X device according to an exemplary embodiment.

FIG. 14 is a schematic structural diagram of a Vehicle to Everything (V2X) device according to an exemplary embodiment. As shown, the V2X device 1400 includes a communication unit 1404 and a processor 1402. The processor 1402 may also be a controller, which is represented as "controller/processor 1402" in FIG. 14. The communication unit 1404 is used to support communication between the V2X device and other network entities (for example, other V2X devices, etc.). Further, the V2X device 1400 may further include a memory 1403, and the memory 1403 is used to store the program code and data of the V2X device 1400.

It can be understood that FIG. 14 only shows a simplified design of the V2X device 1400. In practical applications, the V2X device 1400 may include any number of processors, controllers, memories, communication units, and the like. And all V2X devices that can implement the embodiments of the present disclosure are within the protection scope of the embodiments of the present disclosure.

Those skilled in the art should be aware that in one or more of the foregoing examples, the functions described in the embodiments of the present disclosure can be implemented by hardware, software, firmware, or any combination thereof. When implemented by software, these functions can be stored in a computer readable medium or transmitted as one or more instructions or codes on the computer readable medium. The computer readable medium includes computer storage medium and communication medium, where the communication medium includes any medium that facilitates the transfer of computer programs from one place to another. The storage medium may be any available medium that can be accessed by a general-purpose or special-purpose computer.

Embodiments of the present disclosure also provide a non-transitory computer readable medium for storing computer software instructions executed by the above-mentioned first V2X device or second V2X device. The computer software instructions include the programs designed for performing the method for feedback information transmission between V2X devices mentioned above.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for feedback information transmission between vehicle to everything (V2X) devices, comprising:
   transmitting, by a first V2X device, first user data to a second V2X device;
   receiving, by the second V2X device, the first user data;
   performing, by the first V2X device and the second V2X device respectively, acquiring time window offset information indicating an offset duration between a low boundary or an upper boundary of a feedback time window for the first user data and an end time of the first user data transmission, and determining the feedback time window for the first user data based on the time window offset information and the end time of the first user data transmission;
   transmitting, by the second V2X device, hybrid automatic repeat request (HARQ) feedback information for the first user data to the first V2X device in the feedback time window for the first user data; and
   receiving, by the first V2X device, the HARQ feedback information in the feedback time window for the first user data,
   wherein acquiring the time window offset information further comprises:
     acquiring the time window offset information that is preset or is preconfigured by a base station;
     acquiring the time window offset information that corresponds to a service type of the first user data;
     acquiring the time window offset information that corresponds to a subcarrier spacing of a time-frequency resource for the first user data; or
     acquiring offset indication information carried in scheduling control information for the first user data, and acquiring the time window offset information indicated by the offset indication information.

2. A method for feedback information transmission between vehicle to everything (V2X) devices, applied to a second V2X device, the method comprising:
   receiving first user data from a first V2X device;
   acquiring time window offset information indicating an offset duration between a low boundary or an upper boundary of a feedback time window for the first user data and an end time of the first user data transmission;
   determining the feedback time window for the first user data based on the time window offset information and the end time of the first user data transmission; and
   transmitting hybrid automatic repeat request (HARQ) feedback information for the first user data to the first V2X device in the feedback time window for the first user data,
   wherein acquiring the time window offset information further comprises:
     acquiring the time window offset information that is preset or is preconfigured by a base station;
     acquiring the time window offset information that corresponds to a service type of the first user data;
     acquiring the time window offset information that corresponds to a subcarrier spacing of a time-frequency resource for the first user data; or
     acquiring offset indication information carried in scheduling control information for the first user data, and acquiring the time window offset information indicated by the offset indication information.

3. The method of claim 2, wherein transmitting the HARQ feedback information for the first user data to the first V2X device further comprises:
   transmitting, in the feedback time window for a last retransmission of the first user data, the HARQ feedback information for the first user data, in response to that the first user data is data to be retransmitted; or
   transmitting, for each retransmission of the first user data, the HARQ feedback information for a retransmission of the first user data in a feedback time window corresponding to the retransmission of the first user data, in response to that the first user data is data to be retransmitted.

4. The method of claim 2, wherein transmitting the HARQ feedback information for the first user data to the first V2X device further comprises:
   detecting a target time-frequency resource that satisfies a feedback condition in the feedback time window for the first user data; and
   transmitting the HARQ feedback information for the first user data on the target time-frequency resource.

5. The method of claim 4, wherein the feedback condition comprises at least one of the following conditions:
   a value of signal energy of a corresponding time-frequency resource detected by the second V2X device being less than a preset signal energy threshold;
   the value of the signal energy of the corresponding time-frequency resource detected by the second V2X device on the corresponding time-frequency resource being a minimum one among values of the signal energy of all time-frequency resources in a same time-domain;
   the second V2X device not transmitting data other than the HARQ feedback information on a corresponding time domain resource or a corresponding time-frequency resource; or
   the corresponding time-frequency resource being the time-frequency resource indicated by feedback resource indication information carried in scheduling control information for the first user data.

6. The method of claim 2, wherein transmitting the HARQ feedback information for the first user data to the first V2X device in the feedback time window for the first user data when the feedback time window for the first user data overlaps with a feedback time window for at least one second user data further comprises:
   acquiring an overlapping time window of the feedback time window for the first user data and the feedback time window for the at least one second user data;

acquiring combined information of the HARQ feedback information for the first user data and HARQ feedback information for the at least one second user data; and transmitting the combined information in the overlapping time window.

7. The method of claim 2, wherein transmitting the HARQ feedback information for the first user data to the first V2X device further comprises:

transmitting the HARQ feedback information including data indication information in the feedback time window for the first user data, wherein the data indication information includes:

an address of the first V2X device, an address of the second V2X device, and a HARQ process identifier;

the address of the first V2X device and the address of the second V2X device; or a time-frequency location of the first user data.

8. A method for feedback information transmission between vehicle to everything (V2X) devices that is applied to a first V2X device, the method comprising:

transmitting first user data to a second V2X device;

acquiring time window offset information indicating an offset duration between a low boundary or an upper boundary of a feedback time window for the first user data and an end time of the first user data transmission;

determining the feedback time window for the first user data based on the time window offset information and the end time of the first user data transmission; and receiving hybrid automatic repeat request (HARQ) feedback information for the first user data in the feedback time window for the first user data, wherein acquiring the time window offset information further comprises:

acquiring the time window offset information that is preset or is preconfigured by a base station;

acquiring the time window offset information that corresponds to a service type of the first user data;

acquiring the time window offset information that corresponds to a subcarrier spacing of a time-frequency resource for the first user data; or acquiring offset indication information carried in scheduling control information for the first user data, and acquiring the time window offset information indicated by the offset indication information.

9. The method of claim 8, wherein receiving the HARQ feedback information for the first user data further comprises:

monitoring the HARQ feedback information for the first user data on each available time-frequency resource within the feedback time window.

10. The method of claim 8, wherein receiving the HARQ feedback information for the first user data further comprises:

receiving the HARQ feedback information including data indication information in the feedback time window for the first user data, wherein the data indication information includes:

an address of the first V2X device, an address of the second V2X device, and a HARQ process identifier;

the address of the first V2X device and the address of the second V2X device; or a time-frequency location of the first user data.

11. An apparatus for feedback information transmission between vehicle to everything (V2X) devices that is applied in a second V2X device, the apparatus comprising:

a processor; and a memory that stores a computer program executable by the processor, wherein the processor is configured to perform the method according to claim 2.

12. An apparatus for feedback information transmission between vehicle to everything (V2X) devices that is applied in a first V2X device, the apparatus comprising:

a processor; and a memory that stores a computer program executable by the processor, wherein the processor is configured to perform the method according to claim 8.

* * * * *